United States Patent
Lin et al.

(10) Patent No.: US 11,829,310 B2
(45) Date of Patent: Nov. 28, 2023

(54) DIRECT MEMORY ACCESS (DMA) CONTROLLER, ELECTRONIC DEVICE USING THE DMA CONTROLLER AND METHOD OF OPERATING THE DMA CONTROLLER

(71) Applicant: REALTEK SEMICONDUCTOR CORPORATION, Hsinchu (TW)

(72) Inventors: Chen-Tung Lin, Hsinchu (TW); Yue-Feng Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/488,637

(22) Filed: Sep. 29, 2021

(65) Prior Publication Data
US 2022/0121588 A1    Apr. 21, 2022

(30) Foreign Application Priority Data
Oct. 16, 2020    (CN) ........................ 202011111422.8

(51) Int. Cl.
*G06F 13/28* (2006.01)
*G06F 13/42* (2006.01)
*G06F 9/30* (2018.01)

(52) U.S. Cl.
CPC .......... *G06F 13/28* (2013.01); *G06F 9/30101* (2013.01); *G06F 13/4282* (2013.01)

(58) Field of Classification Search
CPC ... G06F 13/28; G06F 9/30101; G06F 13/4282
See application file for complete search history.

(56) References Cited

U.S. PATENT DOCUMENTS 7,436,954 B2    10/2008    Apostol, Jr. et al.
7,761,617 B2    7/2010    Seigneret et al.
(Continued)

FOREIGN PATENT DOCUMENTS

CN    110609799 A    12/2019

OTHER PUBLICATIONS

OA letter of the counterpart TW application (appl. No. 109136671) dated Nov. 30, 2021. Summary of the OA letter: (1) Claims 1-5 and 7 are rejected under Patent Law Article 22(1) as being anticipated by reference 1 (CN 110609799 A). (2) Claim 6 is rejected under Patent Law Article 22(2) as being unpatentable over reference 1. (3) Claims 8-10 are rejected under Patent Law Article 22(1) as being anticipated by reference 1. Claims 1-10 in the TW counterpart application correspond to claims 1-8, 16 and 19 in the instant US application, respectively.).

*Primary Examiner* — Henry Tsai
*Assistant Examiner* — Harry Z Wang
(74) *Attorney, Agent, or Firm* — WPAT, P.C.

(57) ABSTRACT

A direct memory access (DMA) controller, an electronic device that uses the DMA controller, and a method of operating the DMA controller are provided. The DMA controller is configured to access a memory that contains a secure area and a non-secure area. The method of operating the DMA controller includes the following steps: searching for a DMA channel that is in an idle state in the DMA controller; setting a register value of a mode register of the DMA channel such that the DMA channel operates in a secure mode; setting a memory address register and a byte count register of the DMA channel; and controlling the DMA channel to transfer data based on the memory address register and the byte count register.

19 Claims, 5 Drawing Sheets

(56) References Cited

U.S. PATENT DOCUMENTS

| | | | |
|---|---|---|---|
| 7,904,943 B2* | 3/2011 | O'Connor | G06F 21/74 |
| | | | 710/36 |
| 8,001,390 B2* | 8/2011 | Hatakeyama | G06F 12/1416 |
| | | | 709/212 |
| 8,769,681 B1 | 7/2014 | Michels et al. | |
| 8,880,632 B1 | 11/2014 | Michels | |
| 8,959,304 B2* | 2/2015 | Symes | G06F 12/145 |
| | | | 710/39 |
| 9,424,213 B2 | 8/2016 | Dobbs et al. | |
| 9,740,887 B2 | 8/2017 | Conti | |
| 10,181,946 B2 | 1/2019 | Lal et al. | |
| 10,496,853 B2 | 12/2019 | Taylor et al. | |
| 2003/0140205 A1* | 7/2003 | Dahan | G06F 21/556 |
| | | | 711/163 |
| 2004/0139346 A1* | 7/2004 | Watt | G06F 9/45558 |
| | | | 713/193 |
| 2005/0223136 A1* | 10/2005 | Tanaka | G06F 13/28 |
| | | | 710/22 |
| 2006/0010261 A1* | 1/2006 | Bonola | G06F 13/28 |
| | | | 710/22 |
| 2009/0271536 A1* | 10/2009 | Tiennot | G06F 13/28 |
| | | | 710/28 |
| 2010/0017544 A1* | 1/2010 | Chun | G06F 13/28 |
| | | | 710/22 |
| 2010/0057960 A1* | 3/2010 | Renno | G06F 12/1433 |
| | | | 710/262 |
| 2013/0283391 A1* | 10/2013 | Mangalampalli | G06F 13/28 |
| | | | 726/26 |
| 2014/0250540 A1* | 9/2014 | Balasubramanian | G06F 21/44 |
| | | | 726/29 |
| 2014/0259149 A1* | 9/2014 | Circello | G06F 21/85 |
| | | | 726/16 |
| 2018/0203815 A1* | 7/2018 | Rochford | G06F 5/065 |
| 2019/0196967 A1* | 6/2019 | Choi | G06F 12/0646 |
| 2021/0232327 A1* | 7/2021 | Talvitie | G06F 12/1491 |

* cited by examiner

| DMA channel 0 busy non-secure mode | DMA channel 1 idle non-secure mode | DMA channel 2 idle secure mode | DMA channel 3 busy secure mode | ⋮ |

FIG. 3A

| DMA channel 0 busy | DMA channel 1 idle | DMA channel 2 busy | DMA channel 3 busy | ⋮ |

FIG. 3B

DIRECT MEMORY ACCESS (DMA) CONTROLLER, ELECTRONIC DEVICE USING THE DMA CONTROLLER AND METHOD OF OPERATING THE DMA CONTROLLER

BACKGROUND OF THE INVENTION

1. Field of the Invention

The present invention generally relates to a direct memory access (DMA) controller, and, more particularly, to a shared DMA controller and a method of operating the DMA controller.

2. Description of Related Art

For security purposes, electronic devices usually store confidential or sensitive data in a secure area of a memory (which is also referred to as a secure memory) and store non-confidential or non-sensitive data in a non-secure area of the memory (which is also referred to as a non-secure memory). Therefore, a System on a Chip (SoC) that can switch between a secure mode and non-secure mode usually use separate DMA controllers or separate DMA channels for different modes. This approach, however, uses more resources because the DMA controller or DMA channel is not always used by the same security level (i.e., either the secure mode or non-secure mode).

SUMMARY OF THE INVENTION

In view of the issues of the prior art, an object of the present invention is to provide a DMA controller, an electronic device using the DMA controller, and a method of operating the DMA controller, so as to make an improvement to the prior art.

According to one aspect of the present invention, a direct memory access (DMA) controller configured to access a memory containing a secure area and a non-secure area is provided. The DMA controller includes a DMA channel, a mode register, a configuration interface, and a control circuit. The mode register is configured to store a register value. When the register value is a first value, the DMA channel operates in a secure mode, and when the register value is a second value, the DMA channel operates in a non-secure mode. The configuration interface is configured to receive a control command. The control circuit is coupled to the DMA channel and configured to set the register value of the mode register according to the control command. When the DMA channel is operating in the secure mode, the DMA channel is able to access the secure area and the non-secure area, and when the DMA channel is operating in the non-secure mode, the DMA channel is able to access the non-secure area but unable to access the secure area.

According to another aspect of the present invention, an electronic device is provided. The electronic device includes a processor, a memory, and a DMA controller. The processor is configured to generate a control command which is configured to set an operation mode of the DMA controller. The memory contains a secure area and a non-secure area. The DMA controller is coupled to the processor and the memory through a bus and includes a DMA channel, a configuration interface, and a mode register. The DMA controller receives the control command through the configuration interface. The mode register is configured to store a register value corresponding to the control command. When the register value is a first value, the DMA channel operates in a secure mode, and when the register value is a second value, the DMA channel operates in a non-secure mode. When the DMA channel is operating in the secure mode, the DMA channel is able to access the secure area and the non-secure area, and when the DMA channel is operating in the non-secure mode, the DMA channel is able to access the non-secure area but unable to access the secure area.

According to still another aspect of the present invention, a method of operating a DMA controller is provided. The DMA controller is configured to access a memory containing a secure area and a non-secure area. The method including the steps of: searching for a DMA channel in an idle state in the DMA controller; controlling the DMA channel to operate in a secure mode by setting a register value of a mode register of the DMA channel; setting a memory address register and a byte count register of the DMA channel; and controlling the DMA channel to perform data transfer based on the memory address register and the byte count register.

According to the present invention, the DMA controller or its DMA channel can switch between the secure mode and the non-secure mode. In comparison with the traditional technology, the DMA controller or its DMA channel of the present invention can use a single circuit or hardware to perform both the secure mode DMA operation and the non-secure mode DMA operation, thus saving hardware resources and reducing costs.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 3A is an example reply content that the DMA channel 120 generates in response to polling.

FIG. 3B is another example reply content that the DMA channel 120 generates in response to polling.

DETAILED DESCRIPTION OF THE EMBODIMENTS

The following description is written by referring to terms of this technical field. If any term is defined in this specification, such term should be interpreted accordingly.

The disclosure herein includes a direct memory access (DMA) controller, an electronic device using the DMA controller, and a method of operating the DMA controller. On account of that some or all elements of the controller and the electronic device could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

In the following embodiments, the DMA controller includes two DMA channels or more. However, in other embodiments, the DMA controller may include only one DMA channel. When the DMA controller includes only one DMA channel, operating the DMA controller is equivalent to operating the DMA channel, and vice versa.

Figure 1:
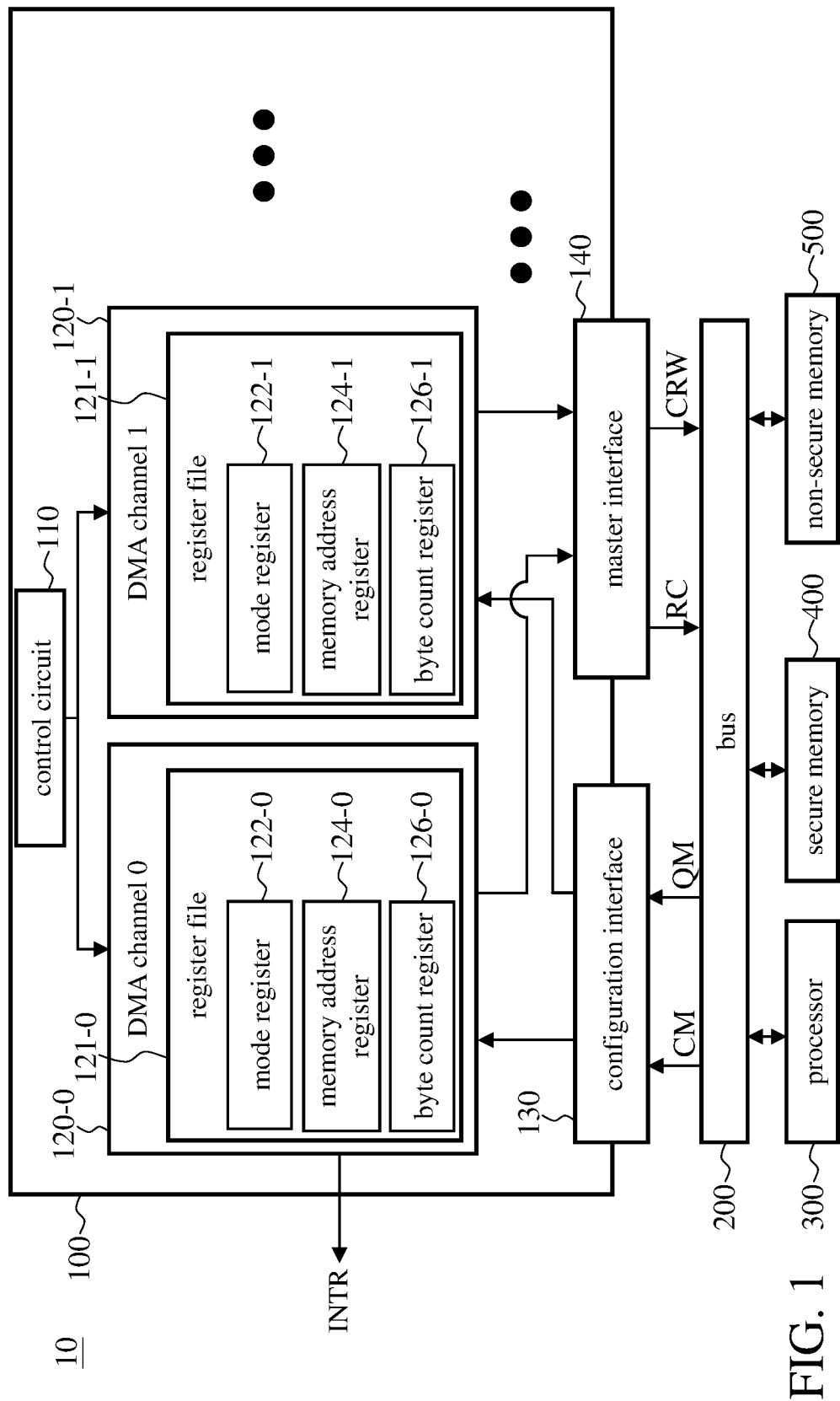
FIG. 1 is a functional block diagram of a DMA controller according to an embodiment of the present invention.

FIG. 1 is a functional block diagram of a DMA controller according to an embodiment of the present invention. The DMA controller 100 includes a control circuit 110, multiple DMA channels 120 (including, but not exclusively, the two DMA channels depicted in the figure: the DMA channel 0 (120-0) and the DMA channel 1 (120-1)), a configuration interface 130, and a master interface 140. Each DMA channel 120 includes a register file 121, and each register file 121 includes a mode register 122, a memory address register 124, and a byte count register 126.

The control circuit 110 may also be referred to as an arbitrator of the DMA controller 100 and may be hardware or a combination of software and hardware. When the control circuit 110 is embodied by hardware, the control circuit 110 may be a finite state-machine (FSM) embodied by logic circuits. When the control circuit 110 is a combination of software and hardware, the control circuit 110 includes a computing unit and a memory. A computing unit is a circuit or electronic component (such as a microprocessor, a micro-processing unit, a digital signal processor, or an application specific integrated circuit (ASIC)) that has the program execution capability. The computing unit executes the program codes or program instructions stored in the memory to carry out the functions of the control circuit 110.

The DMA channel 120 can operate in a secure mode or a non-secure mode, and the DMA channel 0 (120-0) and the DMA channel 1 (120-1) are independent of each other. For example, the DMA channel 0 (120-0) and the DMA channel 1 (120-1) can both be operating in the secure mode or the non-secure mode at the same time, or alternatively, one of which can be operating in the secure mode while the other of which is operating in the non-secure mode. When the register value of the mode register 122 of the DMA channel 120 is the first value (e.g., logic 1), the DMA channel 120 operates in the secure mode, and when the register value of the mode register 122 of the DMA channel 120 is the second value (e.g., logic 0), the DMA channel 120 operates in a non-secure mode.

When the DMA controller 100 or the DMA channel 120 is set to the secure mode, the DMA controller 100 or the DMA channel 120 operates in the secure mode, and all subsequent setting or reading operations must be performed using the secure mode control commands. When the non-secure mode control command attempts to read the DMA controller 100 or the DMA channel 120, or attempts to transfer data by setting the DMA controller 100 or the DMA channel 120, the DMA controller 100 operating in the secure mode or the DMA channel 120 operating in the secure mode rejects these operations. In some embodiments, when the non-secure mode software or hardware attempts to read the settings of the DMA controller 100 operating in the secure mode or the settings of the DMA channel 120 operating in the secure mode, the DMA controller 100 operating in the secure mode or the DMA channel 120 operating in secure mode replies "0," reserved value(s), or random value(s), rather than the genuine value, to prevent the non-secure mode software or hardware from knowing the settings of the DMA controller 100 operating in the secure mode or the settings of the DMA channel 120 operating in the secure mode.

The configuration interface 130 and the master interface 140 are coupled, through a bus 200, to the processor 300 (such as a central processing unit, a microprocessor, a micro-processing unit, a digital signal processor, or an ASIC), a secure memory 400, and a non-secure memory 500. The bus 200 may also be an interconnect matrix or a bus matrix. The secure memory 400 and the non-secure memory 500 can be two separate physical memories (such as dynamic random access memories (DRAM)) or different blocks or areas of the same physical memory (i.e., secure/non-secure block, or secure/non-secure area). The processor 300 transmits the control command CM through the bus 200, and the DMA controller 100 receives the control command CM through the configuration interface 130. The control command CM can be used to set the register value of the mode register 122 of the DMA channel 120. The control command CM includes a security attribute, and the processor 300 generates a secure mode control command CM or a non-secure mode control command CM by controlling the value of the security attribute. More specifically, when operating in the secure mode, the processor 300 generates a control command CM whose security attribute is of a first logical value (e.g., logic 1); when operating in the non-secure mode, the processor 300 generates a control command CM whose security attribute is of a second logical value (e.g., logic 0).

In some embodiments, the control circuit 110 sets the mode register 122 of the target DMA channel 120 according to the control command CM. More specifically, the control circuit 110 sets the mode register 122 of the target DMA channel 120 based on the security attribute. For example, when the security attribute of the control command CM is of the first logical value (e.g., logic 1), the control circuit 110 sets the register value of the mode register 122 of the target DMA channel 120 to the first logical value; when the security attribute of the control command CM is of the second logical value (e.g., logic 0), the control circuit 110 sets the register value of the mode register 122 of the target DMA channel 120 to the second logical value. In some embodiments, the configuration interface 130 may be an Advanced Peripheral Bus (APB), and the security attribute is one of the bits (e.g., bit one, namely, Pprot[1]) of the protection signal (Pprot). In other embodiments, the configuration interface 130 may be an Advanced High-performance Bus (AHB) or other interfaces.

The processor 300, when operating in the secure mode, can read the settings that another processor, which is not shown and operates in the non-secure mode, made to the DMA controller 100 or the DMA channel 120. The processor 300, when operating in the secure mode, can further control the behavior of the DMA controller 100 and/or the DMA channel 120. For example, when the DMA controller 100 or the DMA channel 120 is set to the secure mode, another processor operating in the non-secure mode cannot obtain the DMA controller 100 or the DMA channel 120 to transfer data for itself.

When the DMA channel 120 is operating in the secure mode, the DMA channel 120 can access the secure memory 400 and the non-secure memory 500. When the DMA channel 120 is operating in the non-secure mode, the DMA channel 120 can access the non-secure memory 500 but cannot access the secure memory 400. More specifically, the DMA channel 120 transmits the read/write command CRW to the secure memory 400 and/or the non-secure memory 500 through the master interface 140 and the bus 200. The master interface 140 can distinguish between secure mode commands and non-secure mode commands. The read/write command CRW contains the security attribute, and the secure memory 400 determines whether to allow read and/or write operations based on the security attribute. For example, when the DMA channel 120 is operating in the secure mode, the security attribute of the read/write command CRW that the DMA channel 120 issues is of the first logical value (corresponding to the secure mode), causing the secure memory 400 and the non-secure memory 500 to permit read and/or write operations; when, on the other hand, the DMA channel 120 is operating in the non-secure mode, the security attribute of the read/write command CRW that the DMA channel 120 issues is of the second logical value (corresponding to the non-secure mode), causing the secure memory 400 not to permit read and/or write operations but causing the non-secure memory 500 to permit read and/or write operations. In some embodiments, the master interface 140 may be the APB, the AHB, or an Advanced eXtensible Interface, (AXI). In some embodiments, the bus 200 determines whether to allow the DMA controller 100 or the DMA channel 120 to access the secure memory 400.

Figure 2:
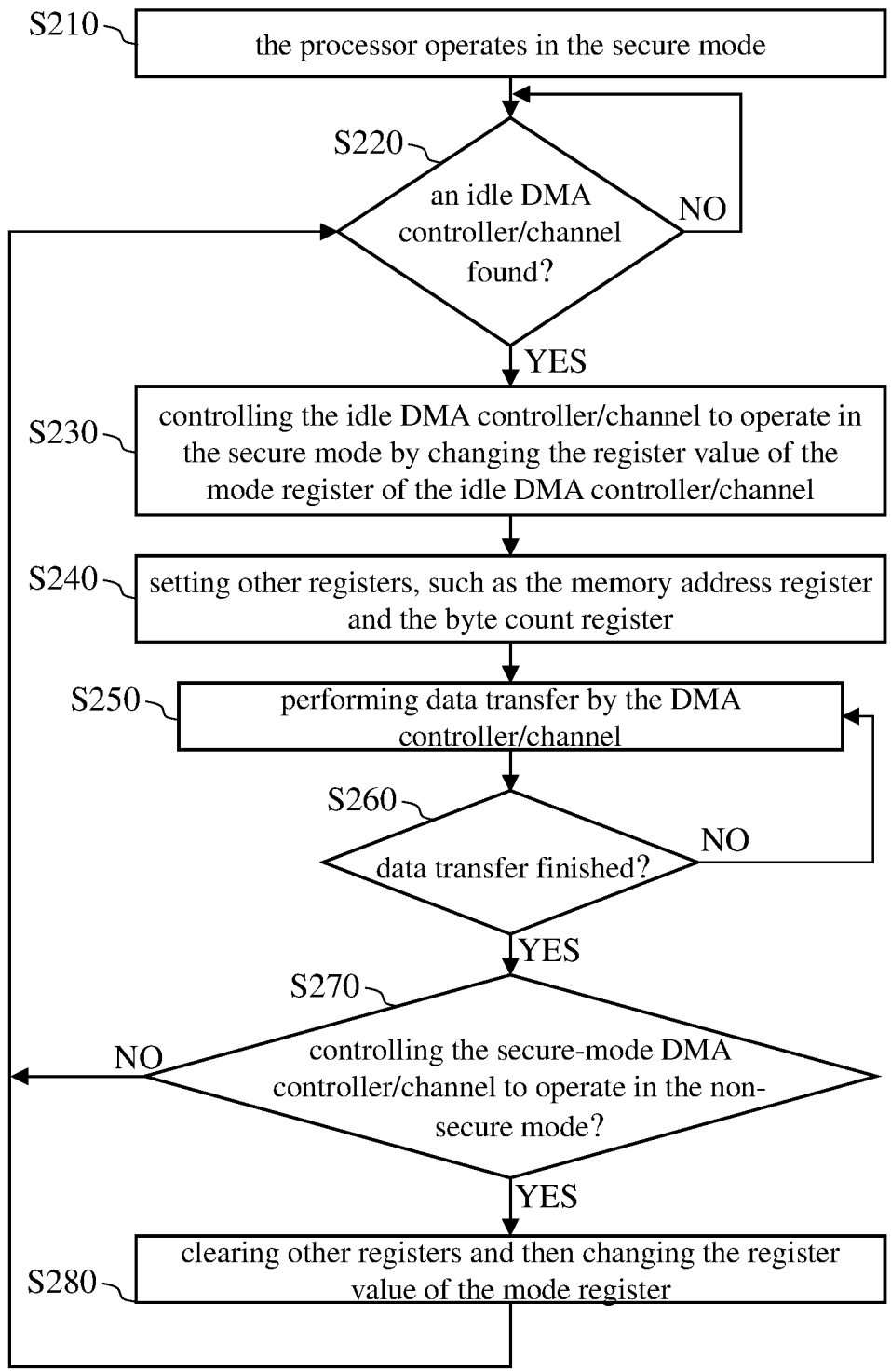
FIG. 2 is a flowchart of a method of operating a DMA controller according to an embodiment of the present invention.

FIG. 2 is a flowchart of a method of operating a DMA controller according to an embodiment of the present invention. At first, the processor 300 operates in the secure mode (step S210) and needs to find an idle (i.e., not in use) DMA controller or DMA channel (step S220). In some embodiments, the processor 300 queries the DMA controller 100 or the DMA channel 120 about its state with a query command QM, for example, visiting each DMA channel 120 of the DMA controller 100 by polling. In response to the polling signal, the DMA channel 120 generates a reply content RC, and the reply content RC is associated with the operation mode of the processor 300 (i.e., the secure mode or the non-secure mode), as illustrated in FIGS. 3A and 3B.

FIG. 3A shows the reply content RC that the DMA channel 120 generates in response to the polling signal from a processor (e.g., the processor 300) operating in the secure mode, and FIG. 3B shows the reply content RC that the DMA channel 120 generates in response to the polling signal from a processor (e.g., the processor 300) operating in the non-secure mode. It is assumed in the examples of FIGS. 3A and 3B that the current operation modes of DMA channel 0 to DMA channel 3 are non-secure mode, non-secure mode, secure mode, and secure mode, respectively, and that the current states of DMA channel 0 to DMA channel 3 are busy, idle, idle, and busy, respectively.

In reference to FIG. 3A, when the processor 300 is operating in the secure mode, the reply content RC that the DMA channel 120 generates includes the current operation mode and the genuine state (i.e., idle or busy) of the DMA channel 120. The genuine state refers to the current state which has not been adjusted, modified or changed of the DMA channel 120. Therefore, the processor 300, when operating in the secure mode, can know the current operation mode and the genuine state of the DMA channel 120.

In reference to FIG. 3B, when the processor 300 is operating in the non-secure mode, the reply content RC that the DMA channel 120 generates includes the state but not the operation mode, and the state in the reply content RC may not necessarily be the current genuine state of the DMA channel 120. More specifically, when the DMA channel operating in the non-secure mode receives a polling signal from the processor 300 which is operating in the non-secure mode, the DMA channel operating in the non-secure mode replies the current state but does not reply the operation mode; when the DMA channel operating in the secure mode receives a polling signal from the processor 300 which is operating in the non-secure mode, the DMA channel operating in the secure mode always replies "busy" and does not reply the operation mode. In other words, in spite of being in the idle state, the DMA channel 2 replies a fake state or a dummy state to prevent the processor 300 which is operating in the non-secure mode from accessing the DMA channel which is operating in the secure mode. Therefore, the processor 300, when operating in the non-secure mode, can know the genuine state of the DMA channel operating in the non-secure mode but cannot know the genuine state of the DMA channel operating in the secure mode, and the processor 300, when operating in the non-secure mode, cannot know the operation mode of the DMA channel With such a design, the processor 300, when operating in the non-secure mode, cannot set the DMA controller 100 operating in the secure mode or the DMA channel 120 operating in the secure mode.

In some embodiments, the processor 300, when operating in the non-secure mode, can query the DMA controller 100 or the DMA channel 120 about whether it is idle but cannot stop the DMA controller 100 or the DMA channel 120 or cannot control the DMA controller 100 or the DMA channel 120 to leave the secure mode.

Figure 4:
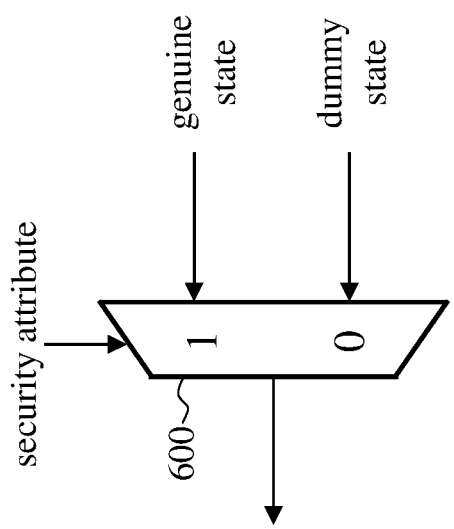
FIG. 4 is an embodiment of a selection circuit that the DMA channel 120 uses to respond to polling.

In some embodiments (as shown in FIG. 4), the DMA channel 120 operating in the secure mode utilizes the selection circuit 600 (e.g., a multiplexer) to reply the genuine state or the dummy state based on the security attribute of the control command CM. When the security attribute is logic 1 (corresponding to the secure mode), the DMA channel 120 replies the genuine state; when the security attribute is logic 0 (corresponding to the non-secure mode), the DMA channel 120 replies the dummy state.

Returning to FIG. 2, when the processor 300 does not find an idle DMA controller or DMA channel (i.e., the result of step S220 is NO), the processor 300 continues to search for an idle DMA controller or DMA channel (step S220). Upon finding an idle DMA controller or DMA channel (i.e., the result of step S220 is YES), the processor 300 controls the idle DMA channel to operate in the secure mode by changing the register value of the mode register 122 of the idle DMA channel (step S230). After setting the mode register 122, the processor 300 proceeds to set the memory address register 124 and the byte count register 126 of the DMA channel through other control commands (step S240). For example, the processor 300 can store the address of the to-be-read/written memory block in the memory address register 124 and store the amount of data in the byte count register 126. After that, the DMA channel 120 performs data transfer by sending a read/write command CRW through the master interface 140 according to the register value in the memory address register 124 and the register value in the byte count register 126 (step S250).

After the data transfer is finished (i.e., the result of step S260 is YES), the DMA channel 120 issues an interrupt to notify the processor 300 that the data transfer has been finished, and then the processor 300 determines whether to control the DMA channel to operate in the non-secure mode (step S270). When the processor 300 wants to continue using the DMA channel, the processor 300 does not control the DMA channel to operate in the non-secure mode (i.e., the result of step S270 is NO) and then continues to select the same DMA channel in step S220. When the processor 300 does not continue using the DMA channel, the processor 300 controls the DMA channel to operate in the non-secure mode (i.e., the result of step S270 is YES). After clearing other registers of the DMA channel (including but not exclusively the memory address register 124 and the byte count register 126), the processor 300 controls the DMA channel to operate in the non-secure mode by changing the register value of the mode register 122 of the DMA channel (step S280), so that other processors operating in the non-secure mode can find the DMA channel in step S220.

Although the flow in FIG. 2 takes the processor 300 operating in the secure mode as an example, people having ordinary skill in the art can apply the present invention to the processor 300 operating in the non-secure mode according to the above discussions, and the details are omitted for brevity.

Figure 5:
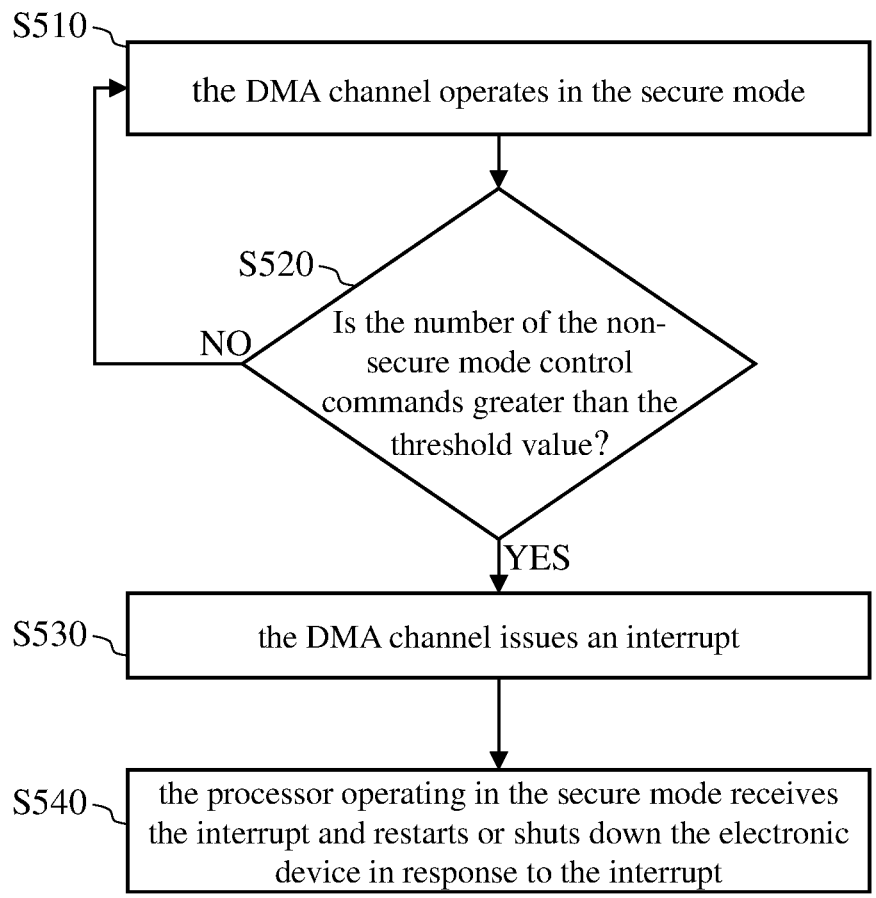
FIG. 5 shows a flowchart of the secure mechanism of the DMA controller or DMA channel according to an embodiment of the present invention.

The DMA controller or DMA channel of the present invention is applied to an electronic device 10 (e.g., devices with computing capabilities and data storage capabilities (such as a computer and a portable electronic device), or a system-on-a-chip (SoC)), and the processor 300 may be the central processing unit, microprocessor, micro-processing unit, digital signal processor, or ASIC of the electronic device 10. In some embodiments, the DMA controller or DMA channel of the present invention has a secure mechanism to protect confidential or sensitive data in the electronic device 10. FIG. 5 shows the flow of the secure mechanism. The DMA channel or DMA controller operating in the secure mode keeps monitoring whether the number of the non-secure mode control commands received is greater than the threshold value (steps S510 and S520). A non-secure mode control command is the command whose security attribute corresponds to the non-secure mode and which is usually issued by a processor operating in the non-secure mode. When the number of non-secure mode control commands that the DMA channel operating in the secure mode has received is greater than the threshold value (i.e., the result of step S520 is YES, which means it is likely that a malicious person is attempting to steal the data in the secure memory 400), the DMA channel operating in the secure mode issues an interrupt INTR (step S530). Then, the processor 300, when operating in the secure mode, receives the interrupt INTR and restarts or shuts down the electronic device 10 in response to the interrupt INTR (step S540) to reduce the risk of data theft.

In some embodiments, the threshold value can be zero, in which case steps S530 and S540 are performed provided that the DMA channel or DMA controller operating in the secure mode receives one non-secure mode control command.

In some embodiments, the reliability of the secure mechanism is improved by restraining the processor operating in the non-secure mode from receiving (or even knowing the presence of) the interrupt INTR.

In summary, the present invention provides a DMA controller and/or DMA channel that can operate in the secure mode or the non-secure mode, and a method of operating the DMA controller and/or DMA channel. The DMA controller operating in the non-secure mode and the DMA channel operating in the non-secure mode cannot obtain the data transferred by the DMA controller operating in the secure mode and the data transferred by the DMA channel operating in the secure mode.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flowchart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A direct memory access (DMA) controller configured to access a memory containing a secure area and a non-secure area, the DMA controller comprising:
   a DMA channel;
   a mode register configured to store a register value, wherein when the register value is a first value, the DMA channel operates in a secure mode, and when the register value is a second value, the DMA channel operates in a non-secure mode;
   a configuration interface configured to receive a control command; and
   a control circuit coupled to the DMA channel and configured to set the register value of the mode register according to the control command;
   wherein when the DMA channel is operating in the secure mode, the DMA channel is able to access the secure area and the non-secure area, and when the DMA channel is operating in the non-secure mode, the DMA channel is able to access the non-secure area but unable to access the secure area.

2. The DMA controller of claim 1, wherein the configuration interface is an Advanced Peripheral Bus.

3. The DMA controller of claim 2, wherein the control command comprises a security attribute, and the security attribute corresponds to one bit of a protection signal of the Advanced Peripheral Bus.

4. The DMA controller of claim 1, wherein the DMA controller receives a query command generated by a processor, the DMA channel generates a reply content in response to the query command, and the reply content comprises a current state of the DMA channel.

5. The DMA controller of claim 4, wherein when the processor is operating in the secure mode, the reply content further comprises a current operation mode of the DMA channel.

6. The DMA controller of claim 1, wherein the DMA controller receives a query command generated by a processor, the DMA channel generates a reply content in response to the query command, and when the DMA channel is operating in the secure mode and in an idle state and the processor is operating in the non-secure mode, the reply content indicates that the DMA channel is in a busy state.

7. The DMA controller of claim 1, wherein when the DMA channel is operating in the secure mode and the control command received is a non-secure mode control command, the DMA channel generates an interrupt in response to the non-secure mode control command.

8. An electronic device, comprising:
   a processor configured to generate a control command, wherein the control command is configured to set an operation mode of a DMA controller;
   a memory containing a secure area and a non-secure area; and
   the DMA controller coupled to the processor and the memory through a bus and comprising:
   a DMA channel;

a configuration interface, wherein the DMA controller receives the control command through the configuration interface; and a mode register configured to store a register value corresponding to the control command, wherein when the register value is a first value, the DMA channel operates in a secure mode, and when the register value is a second value, the DMA channel operates in a non-secure mode;

wherein when the DMA channel is operating in the secure mode, the DMA channel is able to access the secure area and the non-secure area, and when the DMA channel is operating in the non-secure mode, the DMA channel is able to access the non-secure area but unable to access the secure area.

9. The electronic device of claim 8, wherein the configuration interface is an Advanced Peripheral Bus.

10. The electronic device of claim 9, wherein the control command comprises a security attribute, and the security attribute corresponds to one bit of a protection signal of the Advanced Peripheral Bus.

11. The electronic device of claim 8, wherein the processor queries a current state of the DMA channel with a query command, the DMA channel generates a reply content in response to the query command, and the reply content comprises the current state.

12. The electronic device of claim 11, wherein when the processor is operating in the secure mode, the reply content further comprises a current operation mode of the DMA channel.

13. The electronic device of claim 8, wherein the processor queries a current state of the DMA channel with a query command, the DMA channel generates a reply content in response to the query command, and the reply content indicates that the DMA channel is in a busy state when the DMA channel is operating in the secure mode, the current state is an idle state, and the processor is operating in the non-secure mode.

14. The electronic device of claim 8, wherein when the DMA channel is operating in the secure mode and the control command received is a non-secure mode control command, the DMA channel generates an interrupt in response to the non-secure mode control command.

15. The electronic device of claim 14, wherein when the processor is operating in the secure mode, the processor is able to receive the interrupt, and when the processor is operating in the non-secure mode, the processor is unable to receive the interrupt.

16. A method of operating a DMA controller, the DMA controller is configured to access a memory containing a secure area and a non-secure area, the method comprising:

searching for a DMA channel in an idle state in the DMA controller;

controlling the DMA channel to operate in a secure mode by setting a register value of a mode register of the DMA channel;

setting a memory address register and a byte count register of the DMA channel; and controlling the DMA channel to perform data transfer based on the memory address register and the byte count register;

wherein when the DMA channel is operating in the secure mode, the DMA channel is able to access the secure area and the non-secure area, and when the DMA channel is operating in a non-secure mode, the DMA channel is able to access the non-secure area but unable to access the secure area.

17. The method of claim 16, further comprising:

clearing the memory address register and the byte count register after the DMA channel finishes the data transfer; and controlling the DMA channel to operate in the non-secure mode by setting the register value of the mode register of the DMA channel.

18. The method of claim 16, wherein the DMA controller is applied to an electronic device, the method further comprising:

receiving an interrupt issued by the DMA channel; and restarting or shutting down the electronic device in response to the interrupt.

19. The method of claim 16, wherein the step of setting the register value of the mode register of the DMA channel comprises:

sending a control command through an Advanced Peripheral Bus to set the mode register;

wherein the control command comprises a security attribute, and the security attribute corresponds to one bit of a protection signal of the Advanced Peripheral Bus.

* * * * *